United States Patent [19]

Phillips et al.

[11] 3,942,227

[45] Mar. 9, 1976

[54] PARACHUTE RISER BUCKLE

[75] Inventors: John J. Phillips, Rolling Hills; Thomas A. Clark, Santa Monica, both of Calif.

[73] Assignee: G&H Technology, Inc., Santa Monica, Calif.

[22] Filed: Aug. 9, 1974

[21] Appl. No.: 496,111

[52] U.S. Cl. .................. 24/230 A; 24/77 R; 24/196
[51] Int. Cl.² ......................................... A44B 11/06
[58] Field of Search 24/73 PH, 75, 230 A, 230 AV, 24/230 AP, 241 SB; 24/77, 74 R, 196, 197

[56] References Cited
UNITED STATES PATENTS

| | | | |
|---|---|---|---|
| 2,999,288 | 9/1961 | Warner et al. | 24/77 R |
| 3,179,992 | 4/1965 | Murphy, Sr. | 24/77 R |
| 3,541,651 | 11/1970 | Gaylord | 24/230 A |
| 3,805,336 | 4/1974 | Jungevseu et al. | 24/230 AV |

*Primary Examiner*—Werner H. Schroeder
*Assistant Examiner*—Conrad L. Berman
*Attorney, Agent, or Firm*—Dan R. Sadler

[57] ABSTRACT

A parachute riser buckle is provided on the parachute harness for a quick release of the parachute risers from the harness. Blocking means on the buckle body has a latch position in which it blocks removal of the riser connecting portion and an unlatched position for permitting removal of the riser connecting portion. A latch preventing member is provided which has a position in which it prevents the blocking means from returning to its latched position from its unlatched position except when the riser connecting portion is inserted in the buckle body to prevent incorrect and non-positive latching of the blocking means with the riser connecting portion. A handle is provided to rotate with the blocking means and has a surface which prevents the latch preventing member from moving to its latch preventing position except when the handle moves the blocking member to its unlatched position. In order to prevent accidental release of the buckle, a secondary locking member is provided which requires application of a force in a different direction than the force applied to the handle.

11 Claims, 8 Drawing Figures

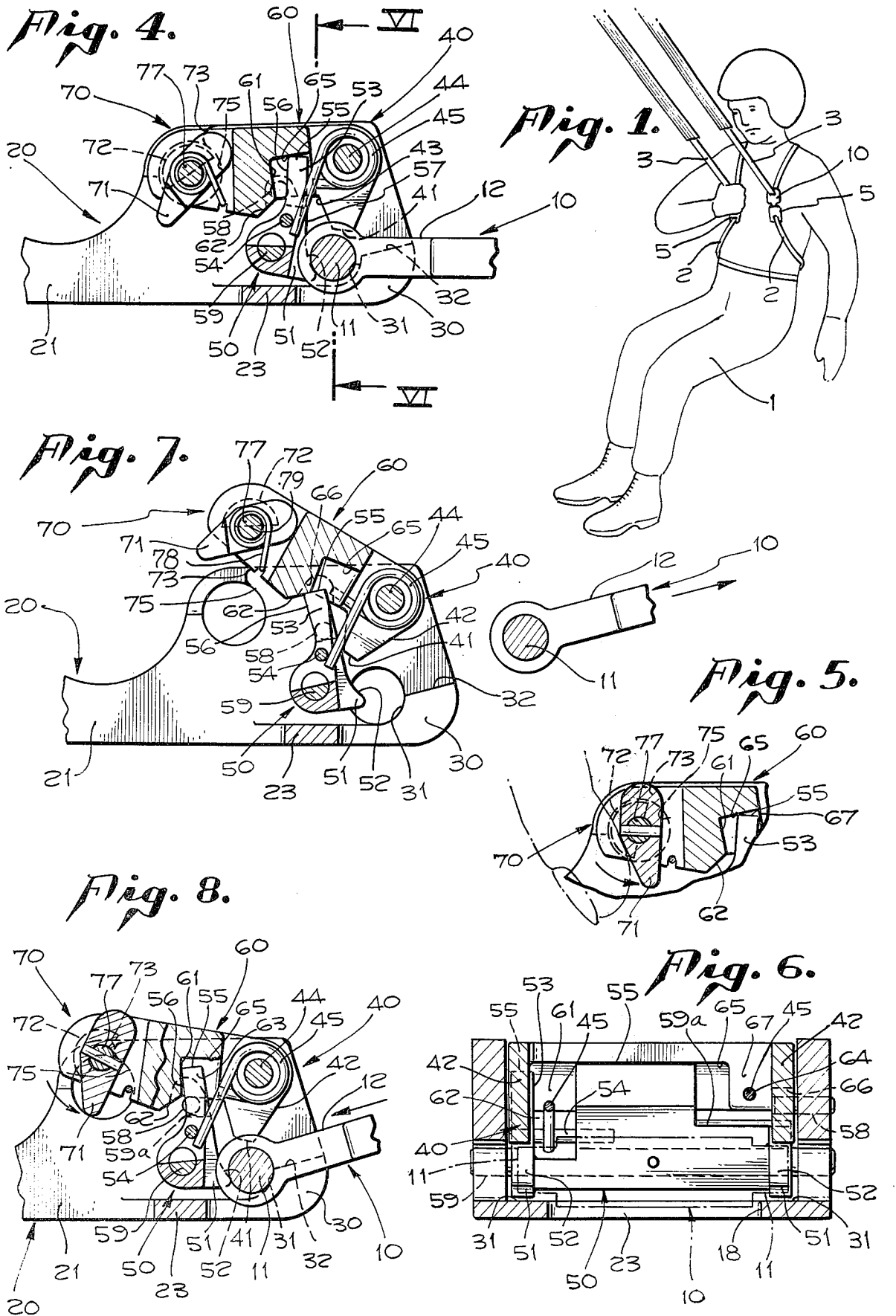

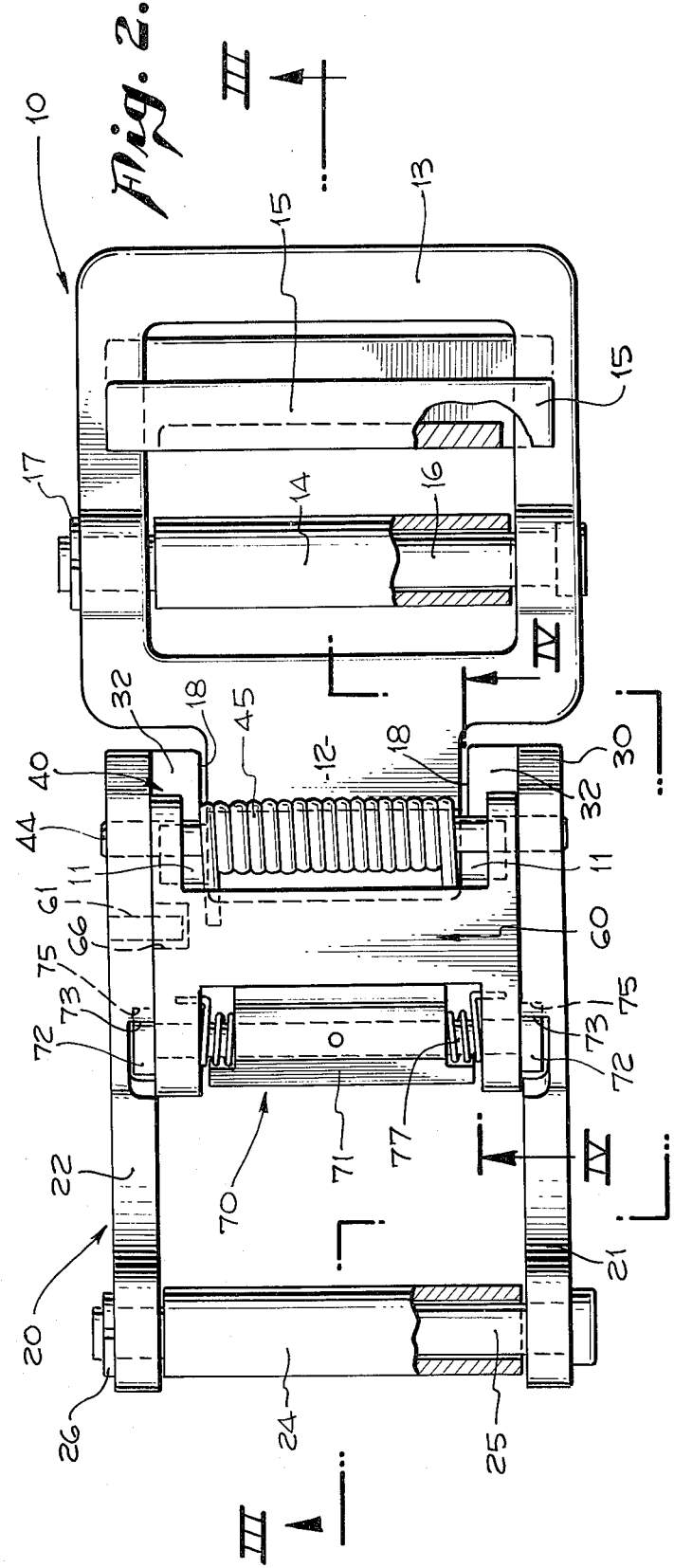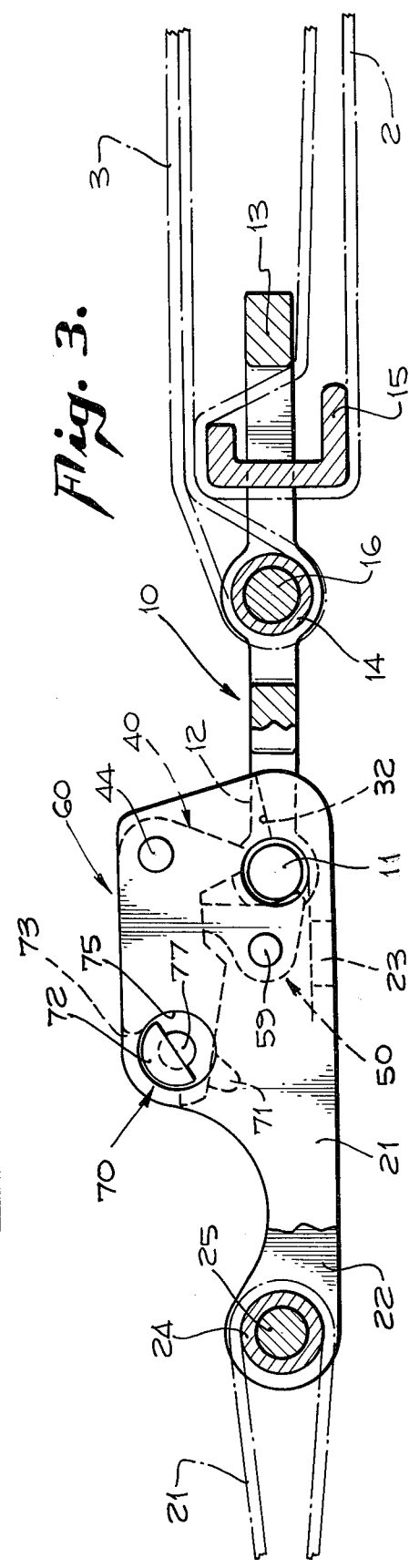

PARACHUTE RISER BUCKLE

BACKGROUND

The use of parachutes has become increasingly more common. Today there are uses for the parachute other than military ones as sky diving and other non-military uses have multiplied. With proper training and adequate safety equipment, parachuting can be a relative safe avocation. However, there are still many dangers associated with parachuting from an airplane.

For example, a parachutist jumping in a strong wind can be dragged along the ground by his parachute and be unable to release it from his harness. At such time, the buckle or other mechanism which attaches the parachute riser to his harness must release the parachute riser with no possibility of snags and non-positive disengagement from the buckle.

When a parachutist accidentally jumps into water, his problems are compounded. He still has the same problems during a strong wind, and he can actually be pulled along the water and be unable to free himself. In a calm wind, the parachute has a tendency to drop directly on the jumper so that he will get tangled in the lines and in the chute itself. The trained jumper will often times try to release his parachute above the surface of the water so that he will actually be freely falling the last 25 to 30 feet without the parachute. Unfortunately, this last method has many drawbacks because it is very difficult to gauge the distance to the surface of the water when the jumper is directly over it. Refraction and reflections from the bottom often confuse the jumper and jumpers have been known to have released their chutes hundreds of feet above the water's surface. A jumper often would release the parachute riser prior to reaching the water because he also could not be sure that the buckle connecting the riser would quickly release the riser as certain prior art buckles did not have a definite unlatched position to indicate that the parachutist was properly releasing the parachute riser.

Another problem associated with parachute riser buckles is to prevent accidental unlatching of the buckle. Obviously, it is imperative that the buckle not release the riser except when the parachutist intends such release. Improper latching of the buckle with the riser must be avoided as such improper latching could cause unexpected release of the riser. Without protection from improper latching, the parachutist could put on the parachute and incorrectly connect the riser to his harness and not notice such error. Then when stresses are applied to the buckle and the riser, such as during deployment of the parachute, the riser might pull away from the buckle. These riser buckles are intended to be used frequently, and it is desirable that the parts upon which any strain is applied be constructed in such a way to minimize the rise of breakage and wear to provide a reliable and long lasting buckle.

SUMMARY

The present invention provides means for overcoming the foregoing difficulties. More particularly, the parachute riser buckle for selectively securing and releasing a connecting portion of the riser includes a buckle body and flange means on the body which hold the riser connecting portion and which guide the riser connecting portion to a position where it will be held. Blocking means are provided on handle means for movement together. When the handle means is in a latched position, the blocking means will also be in a latched position for blocking removal of the riser connecting portion from the flange means. The handle and blocking means have an unlatched position wherein the blocking means permits removal of the riser connecting portion from the flange means. Latch preventing means generally consist of a pivotally mounted member which has a first position preventing the blocking means from returning to its latched position from its unlatched position except by insertion of the riser connecting portion into the buckle to a position where it would be held by the flange means and where removal would be blocked by the blocking means in its latched position. This prevents incorrect and non-positive latching of the blocking means with the riser connecting portion. The blocking means is constructed in such a way that movement of the blocking means to its unlatched position moves the latch preventing means to its first position. A foot extends from the latch preventing means to contact the riser connecting portion during its insertion to rotate the latch preventing means from its first position to its second position. Surfaces on the blocking means and on the flange means guide the riser connecting portion during insertion to the foot portion away from the axis of rotation of the rotatably mounted latch preventing means to rotate the latch preventing means. The handle includes a face which prevents the latch preventing means from moving to its first position except when the handle is in its unlatched position. A pawl extends from the axis of rotation of the latch preventing means and contacts the handle when the handle is in the unlatched position to prevent excessive rotation of the handle means past its latched position. The handle moves under spring bias to its latched position against the pawl and emits a sound when it contacts the pawl to indicate that the handle is latched. A locking member is associated with the handle and locks the handle in its latched position until the locking member is moved to an unlocking mode where it will allow movement of the handle means to its unlatched position. The locking means automatically returns to its locked mode upon movement of the handle to its latched position. In the latched position, the riser connecting portion rests against the foot of the latch preventing means and a spring biases the foot in a direction to eject the riser connecting portion so that when the handle and blocking means moves to its unlatched position, and the latch preventing means is free to move to its first position, the spring will quickly drive the riser connecting portion from the buckle.

DRAWINGS

FIG. 1 is a view of the parachute riser connected to a harness on a parachutist.

FIG. 2 is a plan of the buckle with the parachute riser connecting portion attached thereto.

FIG. 3 is a side view partially in sections of the buckle with the riser connecting portion attached thereto and is taken along line III—III of FIG. 2.

FIG. 4 is a sectional view of the buckle in its latched position and is taken along line IV—IV in FIG. 2.

FIG. 5 is a detailed view of the locking means which prevents movement of the handle.

FIG. 6 is a front sectional view of the buckle and is taken along line VI—VI in FIG. 4.

FIG. 7 is a similar view to FIG. 4 but is taken when the buckle is in its unlatched position and the riser connecting portion is free to move away therefrom.

FIG. 8 is a view similar to FIG. 7 but with the riser connecting portion being inserted and the handle means returning to its latched position.

DESCRIPTION

A parachute riser buckle selectively secures and releases a connecting portion of a parachute riser. Referring to FIG. 1, the parachutist 1 is wearing a harness 2. Parachute riser 3 is connected by the riser connecting portion 10 to the harness 2 by the riser buckle 5. A more complete harness may be provided with a crotch strap and side supporting straps or the like.

The riser connecting portion connects the parachute riser to the riser buckle. In the exemplary embodiment shown more clearly in FIGS. 2 and 3, the riser connecting portion 10 includes a shaft 11 which is held by the buckle. Extending from the shaft 11 is arm 12 which terminates at the support ring 13. The riser holding member 14 is mounted for rotational movement about shaft 16 which is mounted between adjacent sides of the support ring and which is held in place by a clip 17. The body harness holder 15 is also mounted between adjacent sides of the support ring and is slideable therein. As shown particularly in FIG. 3, the body harness 2 fits around the harness holder 15, the riser fits around the riser holder 14, and they are held in the position shown in FIG. 3 by friction between the adjacent straps.

A buckle body is provided. In the preferred embodiment, such buckle body 20 is formed by sidewalls 21 and 22 and a bottom connecting wall 23. A harness connector 24 is mounted on shaft 25 between the side walls 21 and 22 and is held in place by a clip 26. The harness 2 passes around the harness connector 24.

Flange means on the body hold the riser connecting portion and guide the riser connecting portion to a position where it is held. In the exemplary embodiment, such flange means 30 extend from the side walls 22 and 23 as best seen in FIG. 2. In FIG. 4, the curved portion 31 of the flange means is shown holding shaft 11 of the riser connection portion. Most forces between the riser connecting portion and the buckle will be in a direction away from the buckle and generally parallel with the position of the riser connecting portion in FIG. 4. It can be seen that most of the forces will be absorbed by the flange means, and therefore, the flange means are formed as a thicker portion of the side walls of the buckle body as shown more clearly in FIG. 2. A guiding ramp 32 is also part of the flange means and the function of the guiding ramp will be discussed more fully hereinafter. However, briefly referring to FIG. 7, when the riser connecting portion 10 is inserted in the buckle, it may ride upon the guiding ramp 32.

Cut-out portion 18 of the buckle body between the flange means of side walls 21 and 22 allows for rotation about the shaft 11 within the buckle. Arm 12 is slightly narrower than the cut-out portion 18 to permit such rotation. This allows the buckle and the riser connecting portion to assume a natural and comfortable orientation on the parachutist. The riser connecting portion is insertable into the buckle either as shown in FIG. 3 or upside-down depending on the manner in which the straps are connected to the buckle and the riser connecting portion because of the symmetry of the arm 12 and shaft 11 of the riser connection portion.

Blocking means associated with the buckle body has a latched position for blocking removal of the riser connecting portion from the flange means and has an unlatched position for permitting removal of the riser connecting portion from the flange means. In the exemplary embodiment, such blocking means 40 includes a holding down or tangential surface 41 as best shown in the latched position of FIG. 4. The space between surface 41 on the blocking means and rounded surface 31 on the flange means is too small for the shaft 11 of the riser connecting portion 10 to pass. The blocking means is moveable to its unlatched position in FIG. 7 by rotation about axis 44 to a sufficient space for shaft 11 of the riser connecting portion to pass between the flange means and the blocking means.

It should be noted that forces pulling riser connecting portion away from the buckle will not act on blocking member 40 about its axis but will act through the axis because flat surface 41 is tangent to the shaft 11. Tangential forces could inhibit rotation and cause bending of blocking means 40 about the axis 44. This arrangement prevents such forces.

Latch preventing means associated with the buckle body has a first position for preventing the blocking means from returning to its latched position from its unlatched position except by insertion of the riser connecting portion to a position where it would be held by the flange means and where removal would be blocked by the blocking means in its latched position to prevent incorrect non-positive latching of the blocking means with the riser connecting portion. In the exemplary embodiment, such latch preventing means is shown generally at 50. See FIG. 6. In FIG. 7, the latch preventing means 50 is shown in its first position where the top surface 55 of the latch preventing means is in contact with latch face 62 of the handle means 60. In the exemplary embodiment, the handle means is associated with blocking means, and the handle means is in an unlatched position when the blocking means is in its unlatched position and is in its latched position when the blocking means is in its latched position.

Referring again to FIG. 7, the handle means is prevented from returning to its latched position because of contact by the latching face 62 on the handle and latching surface or top surface 55 on the latch preventing means. A strong spring 45 acts on pin 54 on the latch preventing means to bias the latch preventing means counterclockwise about its axis of rotation 59 in FIGS. 4, 7 and 8. Insertion of the riser connecting portion to a position where it would be held by the flange means and where removal would be blocked by the blocking means if the blocking means were in its latched position returns the latch preventing means from its latched position to its unlatched position. As shown more clearly in FIG. 8, the insertion of the riser connecting portion 10 causes shaft 11 to act on foot 51 of the latch preventing means. This force pivots latch preventing means 50 in a clockwise direction to cause latching surface 55 on the latch preventing means to move out of contact with the latching face 62 and the handle means allowing the blocking means to return to its latched position of FIG. 4.

Means are provided on the blocking means to move the latch preventing means to its first position when the blocking means is rotated to its unlatched position. In the exemplary embodiment such means includes a surface 43 which contacts a surface 57 on the latch preventing means above the axis of rotation of the latch preventing means to cause it to rotate in a counterclockwise direction so that it engages the latch face 62 of the handle means. Spring 45 also tends to so rotate the latch preventing means.

The handle means includes a face means for preventing the latch preventing means from moving to its first position except when the handle means is in its unlatched position. Although FIG. 8 shows the latch preventing means being inserted into the buckle and the handle means returning to its latched position, it also illustrates the position of the elements midway through unlatching. The face means 61 on the handle means contacts a surface 56 on the latch preventing means to prevent rotation of the latch preventing means in a counterclockwise direction until movement of the handle means in a clockwise direction causes the surface 56 to pass from the face means 61 to the latching face 62. The elements are so designed that movement of the latch preventing means from the face means 61 to the latch face 62 can only take place when the blocking means has been rotated to a position where the riser connecting portion is free to move away from the buckle.

Surface means on the blocking means and guide means on the flange means guide the riser connecting portion at the foot portion and away from the axis of rotation of the latch preventing means to rotate the latch preventing means. In the preferred embodiment, shown more clearly in FIG. 7, surface 42 on the blocking means 40 and guide means 32 on a flange means form a channel for guiding insertion of the riser connecting portion toward the latch preventing means. The foot means 51 has a rounded portion 52 to contact the rounded shaft 11 of the riser connecting portion. The surface 42 on the blocking means guides the shaft 11 downward (in FIG. 7) against the rounded portion 52 of the foot 51, exerting force about the axis of rotation 59 of the latch preventing means 50 thereby rotating the latch preventing means in a clockwise direction to allow latching of the blocking means and handle means. FIG. 8 shows latching taking place. The handle means which is fixedly attached to the blocking means is pivotally mounted therewith about axis 44. Spring 45 is attached to the handle means 60 at a slot 64 on boss 67 (FIG. 6). The spring tends to bias the handle means and the blocking means in a counterclockwise direction toward their latched position in FIGS. 4, 7 and 8.

Pawl means extends from the axis of rotation of the latch preventing means to a point where it would contact the handle means in its latched position whereby the pawl means prevents excess rotation of the handle means past its latched position to positively identify latched position of the handle means and whereby the coming together of the handle means and the pawl means when the handle means moves to its latched position emits a sound to indicate that the handle means is latched. In the exemplary embodiment, the pawl means 53 extends from the axis of rotation of the latch preventing means 50. The strong spring 45 drives the handle means in a counterclockwise direction in FIG. 8 upon insertion of the riser connecting portion. When the handle means reaches its latched position, shown in FIG. 4, the top surface 55 of the pawl means 53 rests against surface 65 at a somewhat fast speed due to the driving of the spring 45 and this coming together emits a sound to indicate that the handle means is latched.

The forces from the rotating handle means absorbed by the pawl are transmitted to the rest of the latch preventing means toward the axis thereof. This minimizes the forces about axis 55 to decrease the chance of damage to the latch preventing means.

Additionally, a pin 58 extends from a side wall of the buckle means for additional support of the handle means. The pin 58 normally is within the cavity 66 formed on the handle means and contacting the surface of the cavity. Pin 58 serves an additional function of providing a stop for excess rotation in a counterclockwise direction of the latch preventing means 50 because in the unlatched position, (FIG. 7) the pin 58 contacts lower angled surface 59 of the latch preventing means to prevent the latch preventing means from moving too far in the counterclockwise direction to disengage handle latch face 62 from the latching surface 55 on the latch preventing means.

Locking means are associated with the handle means for locking the handle in its latched position until the locking means is moved to an unlocking mode where it allows rotation of said handle means to its unlatched position. In the exemplary embodiment, such locking means 70 includes a locking handle 71 pivotally mounted on shaft 77 (FIG. 2) through the handle means. As shown more clearly in FIG. 5, the locking handle is rotated by the finger or fingers in a counterclockwise direction until the semicircular member rotates to the position shown in FIG. 5 presenting a clearance 74 between the semicircular member and the cam surface 73. As shown in FIG. 4, until the locking means assumes the position in FIG. 5, the semicircular member 72 will contact the locking surface 75. It can be seen in FIG. 5 that once semicircular member 72 is free to move past the cam surface 73 by creation of space 74 between the cam surface 73 and the semicircular member 72, the finger 4 is in such a position that additional forces on the locking handle 71 are in a generally upward direction, that is, tending to cause clockwise rotation of the handle means 60.

This is a desirable safety feature because two different directions of force application are required to release the buckle. First, the finger must move downwardly in FIG. 5 which is not in the same direction as unlatching rotation of the handle means. However, if the handle is intended to be unlatched, it is desirable to unlatch it in a quick manner. Therefore, once the locking means is in a position where the handle can be unlocked, the natural forces of the finger will follow through on the movement of the locking handle 71 and lift and rotate the handle means 60.

Return means are associated with the locking means to return the locking means to its locked position upon rotation of the handle to its latched position. In the preferred embodiment, such return means includes the flat surface 79 of the semicircular member 72 which, as shown in FIG. 8, is contacting the cam surface 73. As the handle means moves counterclockwise, the semicircular member 72 and the locking handle 71 will pivot counterclockwise until the semicircular member is past the cam 73. Thereafter, the spring 78 will return the locking means to the position shown in FIG. 4.

The arrangement of the parts in the buckle has certain advantages. For example, single spring 45 not only biases the latch preventing means 50 in a counterclockwise direction to its first position, but it also serves to bias the handle means and likewise the blocking means toward their latched position. The strong force of the spring snaps the latch preventing means to its latched position in FIG. 7. This strong spring also tends to snap the foot portion in a counterclockwise direction just at the moment that blocking means no longer blocks removal of the riser connecting portion 10. Therefore, the foot portion tends to eject the riser connecting portion from the buckle. Of course, this is a desirable feature because it is an object of the invention that separation of the buckle and riser connecting portion takes place as quickly as possible.

It is also advantageous that the main forces on the buckle from the riser connecting portion are applied to the flange means. These flange means are preferably forged or cast with the buckle body side walls 21 and 22. Most forces will be absorbed by these flanges. If any forces are directed toward the blocking means 40, they will be applied through the axis of rotation 44 of the blocking means, instead of about the axis to present the strongest force resistance by the blocking means. Moreover, there will be no rotative forces applied to the blocking means and consequently to the handle means to prevent bending or fracturing of the blocking means.

It is also desirable to have the foot portion of the latch preventing means contacting the riser connecting portion in the latched position. Even though the largest forces will be pulling away from the foot portion, small jerks in the opposite direction of the normal pull of the riser connecting portion are absorbed by the foot portion and the spring 45. Therefore, there will be less rattling of parts and the device will be quieter in use.

The handle means has two distinct positions, latched and unlatched. When the buckle is in the unlatched position (FIG. 7), the handle cannot be lowered to the latched position shown in FIG. 4 unless the riser connecting portion is inserted in the buckle in its correct position so that return of the handle will return the blocking means to its latched position where it will block removal of the riser connecting portion. This feature is important for many reasons. It could be very easy to insert the riser connecting portion into a buckle and get partial connection of the riser connecting portion to the buckle. However, in the present invention there is no movement of the blocking means until the riser connecting portion is located correctly. That leaves a very large gap between the holding means and the flange means in FIG. 7, and therefore, the riser connecting portion cannot be loosely held but will immediately fall out of the buckle when even the slightest force is applied. Of course, in the usual orientation shown in FIG. 1, gravity would pull the riser connecting portion and the buckle apart. Moreover, the handle means is in a raised position when the buckle is in its unlatched mode and merely observing the handle means in such orientation will quickly indicate that the buckle is in its unlatched condition.

It is also important to note that guiding surface 42 on the blocking means forces the riser connecting portion downward on the foot portion to rotate the latch preventing means upon the insertion of the riser connecting portion. The foot means of the latch preventing means are located adjacent the side walls 21 and 22 of the buckle body (FIG. 6) and the rest of the riser connecting portion extends between the two foot means. Attempting to manually release the latch preventing means without insertion of the riser connecting portion results in pushing the bottom of the latch preventing means near the center of the buckle body near the axis of rotation 59 of the latch preventing means. However, manually pushing there does not cause an adequate rotative force on the latch preventing means to release it from the handle. Therefore, the correct insertion of the riser connecting portion into the buckle is necessarily needed in order to latch the buckle.

Thus a parachute riser buckle 5 for selectively securing and releasing a connecting portion 10 of a riser has been shown to include a buckle body 20, and flange means 30 on the body for holding the riser connecting portion and for guiding the riser connecting portion to a position where it is held. Blocking means 40 are associated with the buckle body and have a latched position (FIG. 4) for blocking removal of the riser connecting portion from the flange means and have an unlatched position (FIG. 7) for permitting removal of the riser connecting portion from the flange means. Latch preventing means 50 is associated with the buckle body and has a first position (FIG. 7) preventing the blocking means 40 from returning to its latched position from its unlatched position except by insertion of the riser connecting portion 10 (FIG. 8) to a position where it would be held by the flange means and where removal would be blocked by the blocking means in its latched position to prevent incorrect non-positive latching of the blocking means with the riser connecting portion. Means 43 on the blocking means moves the latch preventing means to its first position when the blocking means is rotated to its unlatched position. Handle means 60 is associated with the blocking means 40 and has latched and unlatched positions corresponding to the latched and unlatched positions of the blocking means. The handle means has a face means 61 for preventing the latch preventing means from being in its first position except when the handle means is in its unlatched position. The latch preventing means is pivotally mounted for rotation between its first and second positions and it further includes a foot means 51 extending from the latch preventing means to contact the riser connecting portion during its insertion to rotate the latch preventing means from its first to its second position. A spring is associated with the latch preventing means to bias the latch preventing means to its first position for assisting in moving the latch preventing means to its first position and for pivoting the foot portion to eject the riser connecting portion from the buckle. A surface on the blocking means and guide means on the flange means guide the riser connecting portion at the foot portion away from the axis of rotation of the latch preventing means to rotate the latch preventing means. Pawl means 53 extends from the axis of rotation of the latch preventing means to a point where it would contact the handle means 60 in its latched position to prevent excess rotation of the handle means past its latched position and whereby coming together of the handle means and the pawl means when the handle means moves to its latched position emits a sound to indicate that the handle means is latched for positively identifying such latching. Locking means 70 is associated with the handle means for locking the handle means in its latched position until the locking means is moved to an unlocking position where it allows rotation of the handle means to its unlatched position. Return means are associated with the locking means to return the locking means to its locked position upon rotation of the handle means to its latched position.

The locking means 70 includes a locking handle 71 rotatably mounted on the handle means between a locked and an unlocked position. The locking handle moves in a direction opposite the unlatching rotation of the handle means until the locking handle is in its unlocked position and the locking handle will move in a direction with the unlatching rotation of the handle means to cause continued force on the locking handle to unlatch the locking means.

Having thus described the invention what is claimed is:

1. A parachute riser buckle for selectively securing and releasing a connector fitting on the parachute riser comprising, a buckle body, a guide on said buckle body, said guide being effective to engage said fitting and guide said fitting into said buckle body and into the position where it is held, blocking means on said buckle body adjacent to said guide, said blocking means being movable between a latched position and an unlatched position, said blocking means when in the latched position being effective to block the removal of the riser connector fitting from said guide and when in the unlatched position being effective to permit removal of said riser connector fitting from said guide, latch preventing means on said buckle body movable between a first position and a second position, said latch preventing means when in the first position being effective to prevent said blocking means from returning to its latched position from its unlatched position except when said riser connector fitting is in the position where it is held in said guide and its removal is blocked by said blocking means in its latched position to thereby prevent incorrect and non-positive latching of said blocking means with said riser connecting portion, and means on said blocking means to move said latch preventing means to its first position when said blocking means is rotated to its unlatched position.

2. A parachute riser buckle for selectively securing and releasing a connector fitting on the parachute riser comprising, a buckle body, a guide on said buckle body, said guide being effective to engage said connector fitting and guide said fitting into said buckle body and into the position where it is held, blocking means on said buckle body adjacent to said guide, said blocking means being movable between a latched position and an unlatched position, said blocking means when in the latched position being effective to block the removal of the riser connector fitting from said guide and when in the unlatched position being effective to permit removal of said riser connector fitting from said guide, latch preventing means on said buckle body movable between a first position and a second position, said latch preventing means when in the first position being effective to prevent said blocking means from returning to its latched position from its unlatched position except when said riser connector fitting is in the position where it is held in said guide and its removal is blocked by said blocking means in its latched position to thereby prevent incorrect and nonpositive latching of said blocking means with said riser connecting portion, handle means interconnected with said blocking means and movable between an unlatched position and a latched position, said handle means being in said unlatched position when said blocking means is in its unlatched position and being in said latched position when said blocking means is in its latched position, face means on said handle means for preventing said latch preventing means from being in its first position except when said handle means is in its unlatched position, said latch preventing means being pivotally mounted for rotation between its unlatched and latched positions, and foot means on said latch preventing means and extending from the latch preventing means to contact said riser connector fitting during its insertion to rotate said latch preventing means from its first position to its second position.

3. The buckle of claim 2 including, surface means on said blocking means and said guide means to guide said riser connector fitting toward said foot portion and away from the axis of rotation of said latch preventing means to rotate said latch preventing means.

4. The buckle of claim 2 including, spring biasing means interconnected with said latch preventing means and effective to bias said latch preventing means to its first position to assist in moving said latch preventing means to its first position and for pivoting said foot portion to eject said riser connecting portion from said buckle.

5. A parachute riser buckle for selectively securing and releasing a riser connector fitting, said riser buckle including the combination of, a buckle body, a guide on said buckle body adapted to engage said riser connector fitting, said guide being effective to guide said riser connector fitting into said buckle body and into the position where it is to be held, blocking means on said buckle body adjacent to said guide, said blocking means having a latched position and an unlatched position, said blocking means when in the latched position being effective to block the removal of the riser connector fitting from said guide and when in the unlatched position being effective to permit removal of said riser connecting portion from said flange means, a latch on said buckle body having a first position and a second position, said latch when in the first position being effective to prevent said blocking means from returning to its latched position except when said riser connector fitting is in the position where it is held by said guide and its removal is blocked by said blocking means in its latched position to thereby prevent incorrect and non-positive latching of said blocking means with said riser connector fitting, handle means on said blocking means and movable between an unlatched position when said blocking means is in its unlatched position and a latched position when said blocking means is in its latched position, face means on said handle means for preventing said latch from being in its first position except when said handle means is in its unlatched position, said latch is mounted for rotation on said buckle body between its first and second position, said handle means is fixedly attached to said blocking means and mounted for rotation therewith on said buckle body, and pawl means on said latch extending from the axis of rotation of said latch preventing means to a point where it would contact said handle means in its latched position whereby said pawl means prevents excess rotation of said handle means past its latched position to positively identify the handle means being in its latched position and whereby the coming together of said handle means and said pawl means when said handle means moves to its latched position emits a sound to indicate that the handle means is latched.

6. A parachute riser buckle for selectively securing and releasing a connector fitting on the riser including the combination of, a buckle body, a guide on said buckle body, said guide being effective to engage said riser fitting and guide said fitting into said buckle body and into the position where it is held, blocking means on said buckle body adjacent to said guide, said blocking means being movable between a latched position and an unlatched position, said blocking means when in the latched position being effective to block the removal of the riser connector fitting from said guide and when in the unlatched position being effective to permit removal of said riser connector fitting from said guide flange means, latch on said buckle body movable between a first position and a second position, said latch when in the first position being effective to prevent said blocking means from returning to its latched position from its unlatched position except when said riser connector fitting is in the position where it is held in said guide and its removal is blocked by said blocking means in its latched position to thereby prevent incorrect and non-positive latching of said blocking means with said riser connecting portion, handle means on said blocking means movable between an unlatched position and a latched position, said handle means being in an unlatched position when said blocking means is in its unlatched position and being in a latched position when said blocking means is in its latched position, face means on said handle means for preventing said latch from being in its first position except when said handle means is in its unlatched position, said handle means being mounted for rotation on said buckle body and fixed to said blocking means for rotation therewith, locking means interconnected with said handle means for locking said handle means in its latched position when said locking means is in its locked position until said locking means is moved to an unlocking position where it allows rotation of said handle means to its unlatched position, and return means interconnected with said locking means to return the locking means to its locked position upon rotation of said handle means to its latched position.

7. The riser buckle of claim 6 including, a locking handle on said locking means rotatably mounted on said handle means and movable between a locked and an unlocked position said locking handle moving in a direction opposite the unlatching rotation of the handle means until said locking handle is in its unlocked position where said locking handle moves in a direction with the unlatching rotation of the handle means to cause continued force on said locking handle to unlatch said handle means.

8. A parachute riser buckle for selectively securing and releasing a riser connector fitting of the parachute riser comprising, a buckle body, a guide on said buckle body, said guide being effective to engage said riser fitting and guide said riser fitting into said buckle body and into the position where it is to be held, blocking means on said buckle body adjacent to said guide, said blocking means being movable between a latched position and an unlatched position, said blocking means when in the latched position being effective to block the removal of the riser connector fitting from said guide and when in the unlatched position being effective to permit removal of said riser connector fitting from said guide, latch on said buckle body movable between a first position and a second position, said latch when in the first position being effective to prevent said blocking means from returning to its latched position from its unlatched position except when said riser connector fitting is in the position where it is held in said guide and its removal is blocked by said blocking means in its latched position to thereby prevent incorrect and non-positive latching of said blocking means with said riser connecting portion, said blocking means being rotatable about an axis, a tangential surface on said blocking means generally tangential to a circle about said axis, said tangential surface contacting said riser connecting portion so that forces from the riser connecting portion on the blocking means are directed at the axis of rotation of said blocking means to prevent forces about the axis on said blocking means, locking means interconnected with the handle means to selectively prevent or permit said handle means from moving to its opened position to release said riser connecting portion, and means on said handle means to move said latch preventing means to a position where it prevents latching of the handle means with the riser connecting portion.

9. The improved parachute riser buckle of claim 8 including, face means on said handle means, said face means being effective for preventing said latch from being in a position for holding said handle means in its open position except when said handle means is in its opened position.

10. The parachute riser buckle of claim 9 wherein said latch is pivotally mounted for movement between a first position wherein it holds said handle means in its opened position and a second position wherein it permits the handle means to move to its closed position, foot means on said latch extending from the latch to contact said riser connecting portion during its insertion to rotate said latch from its first position to its second position.

11. The improvement of claim 10 including, spring biasing means associated with said latch to bias said latch to its first position to assist in moving said latch to its first position and for pivoting said foot portion to eject said riser connecting portion from said buckle when said handle means is moved to its opened position.

* * * * *